Figure 1:
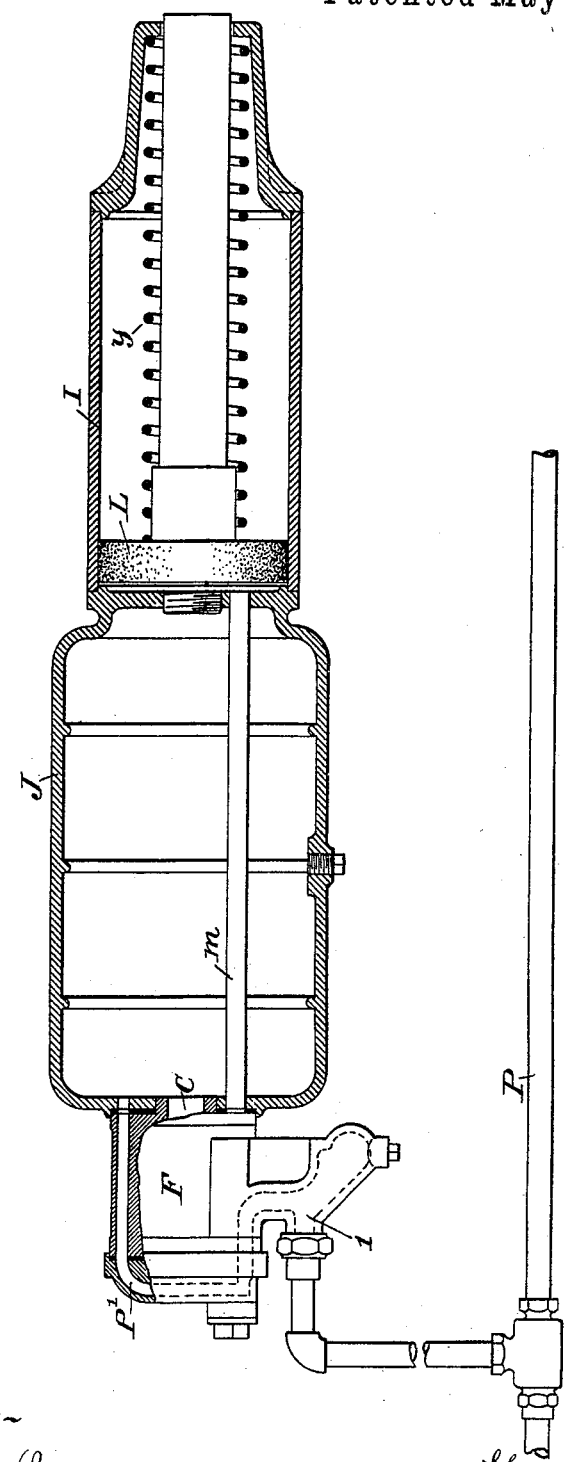

(No Model.) 4 Sheets—Sheet 2.
G. A. BOYDEN.
FLUID PRESSURE BRAKE.

No. 583,277. Patented May 25, 1897.

Witnesses
Charles B. Mann Jr.
Chapin A. Ferguson

Inventor
George A. Boyden
By Chas. B. Mann
Atty (No Model.)  4 Sheets—Sheet 3.
G. A BOYDEN.
FLUID PRESSURE BRAKE.
No. 583,277. Patented May 25, 1897.

Witnesses:—
Charles B. Mann Jr.
Chapin A. Ferguson

Inventor:—
George A. Boyden
By Chas. B. Mann
Atty (No Model.) 4 Sheets—Sheet 4.

G. A BOYDEN.
FLUID PRESSURE BRAKE.

No. 583,277. Patented May 25, 1897.

Witnesses:—
Charles B. Mann Jr.
Chapin A. Ferguson.

Inventor:—
George A. Boyden
By Chas B. Mann
Atty

UNITED STATES PATENT OFFICE.

GEORGE A. BOYDEN, OF MOUNT WASHINGTON, MARYLAND.

FLUID-PRESSURE BRAKE.

SPECIFICATION forming part of Letters Patent No. 583,277, dated May 25, 1897.

Original application filed August 10, 1896, Serial No. 602,247. Divided and this application filed March 20, 1897. Serial No. 628,413. (No model.)

*To all whom it may concern:*

Be it known that I, GEORGE A. BOYDEN, a citizen of the United States, residing at Mount Washington, in the county of Baltimore and State of Maryland, have invented certain new and useful Improvements in Fluid-Pressure Brakes, of which the following is a specification.

This invention relates to automatic air-brakes; and the object of the invention is to provide for venting air from the train-pipe at the time of applying the brakes for emergency stops and utilizing such vented train-pipe air for breaking purposes in a novel way, and also to produce a quicker full-pressure application of each individual brake of a long train than has heretofore been possible.

In the so-called "quick-action" automatic air-brake now in general use when applying the brakes for emergency stops the operation is to vent the train-pipe under each car of the train, thereby reducing the pressure in the train-pipe at numerous points and utilize this vented air by discharging it directly into the brake-cylinder on each car, where it unites with the auxiliary-reservoir air. To effect this operation, the compressed air in the auxiliary reservoirs, which is at higher pressure than the train-pipe air at the moment of applying the brakes, must be retarded or restricted in flowing to the brake-cylinders, in order to permit the lower-pressure train-pipe air to have precedence or to enter the brake-cylinders before any great amount of the higher-pressure auxiliary-reservoir air has entered. This retarded flow of the auxiliary-reservoir air prevents the quick accumulation of the maximum pressure in the brake-cylinders, and consequently permits a rapid-moving train to traverse a greater distance on the track than would be possible if the flow of the high-pressure auxiliary-reservoir air was not retarded.

In the present invention the discharge of the train-pipe air into the brake-cylinders is dispensed with when making an application of the brakes for an emergency stop, and instead the train-pipe air is discharged into the auxiliary reservoirs. This new method of utilizing the vented train-pipe air when making an emergency stop, by discharging it from the train-pipe under each car directly into the auxiliary reservoir, permits of the auxiliary-reservoir air being quickly and freely discharged into the brake-cylinder when making an emergency application of the brakes and produces a quicker maximum brake-cylinder pressure than heretofore and at the same time obtains the desired successive quick action of the several brakes throughout the train. This operation results in stopping a train in a shorter distance and in less time than can be done by that class of brakes in which the train-pipe air is discharged into the brake-cylinder and where the accumulation of the maximum pressure in the brake-cylinder of necessity is delayed by retarding the flow of the auxiliary-reservoir air.

In the practice of this invention a train-pipe, an auxiliary reservoir, a brake-cylinder, and a triple valve of any of the well-known forms may be employed, said parts comprising an automatic air-brake.

A construction whereby the desired result is accomplished will be described in connection with the accompanying drawings, which illustrate one way of carrying the invention into effect.

Figure 2:
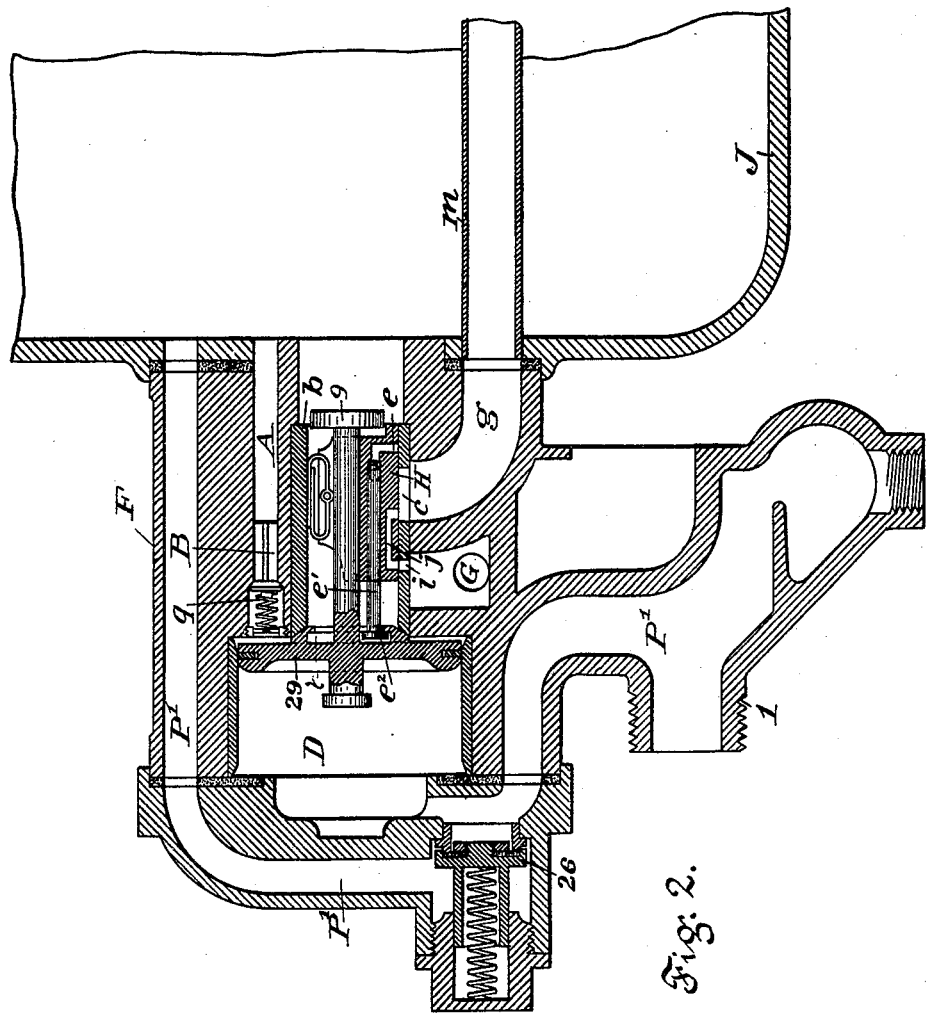
Figure 3:
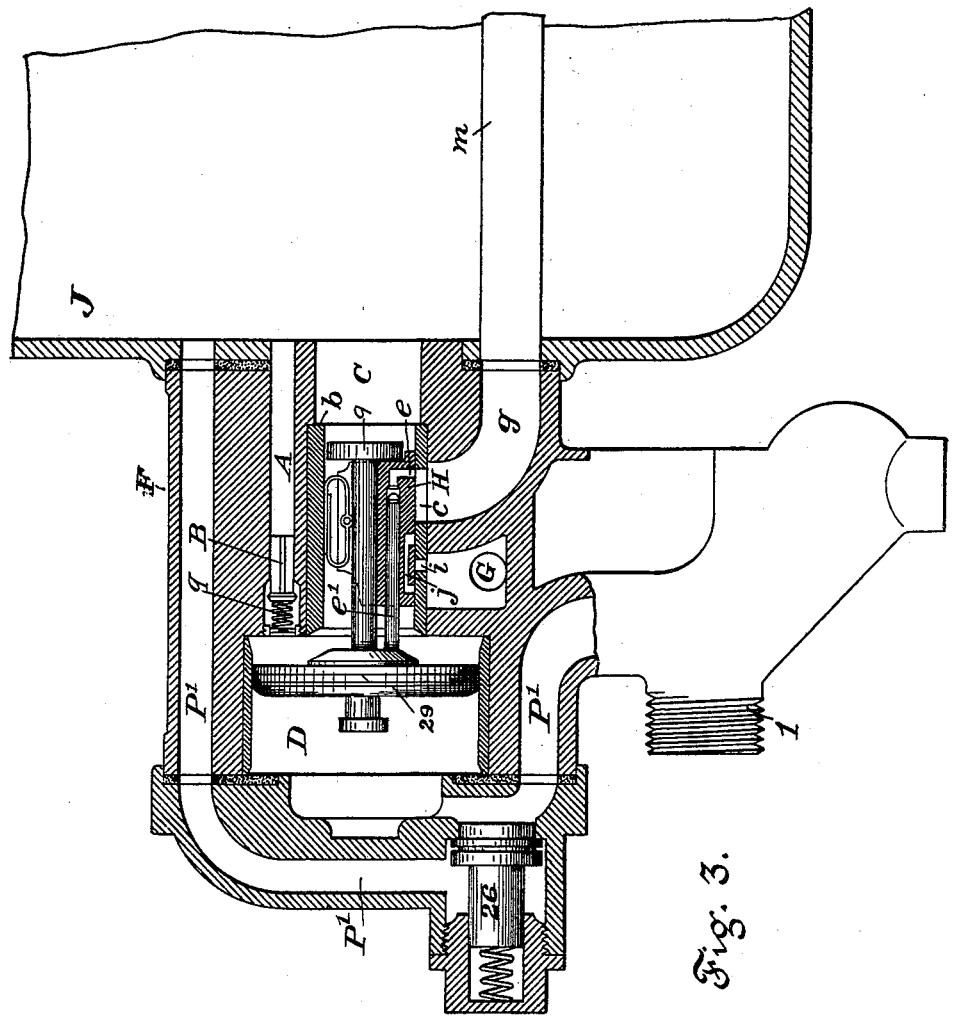
Figure 4:
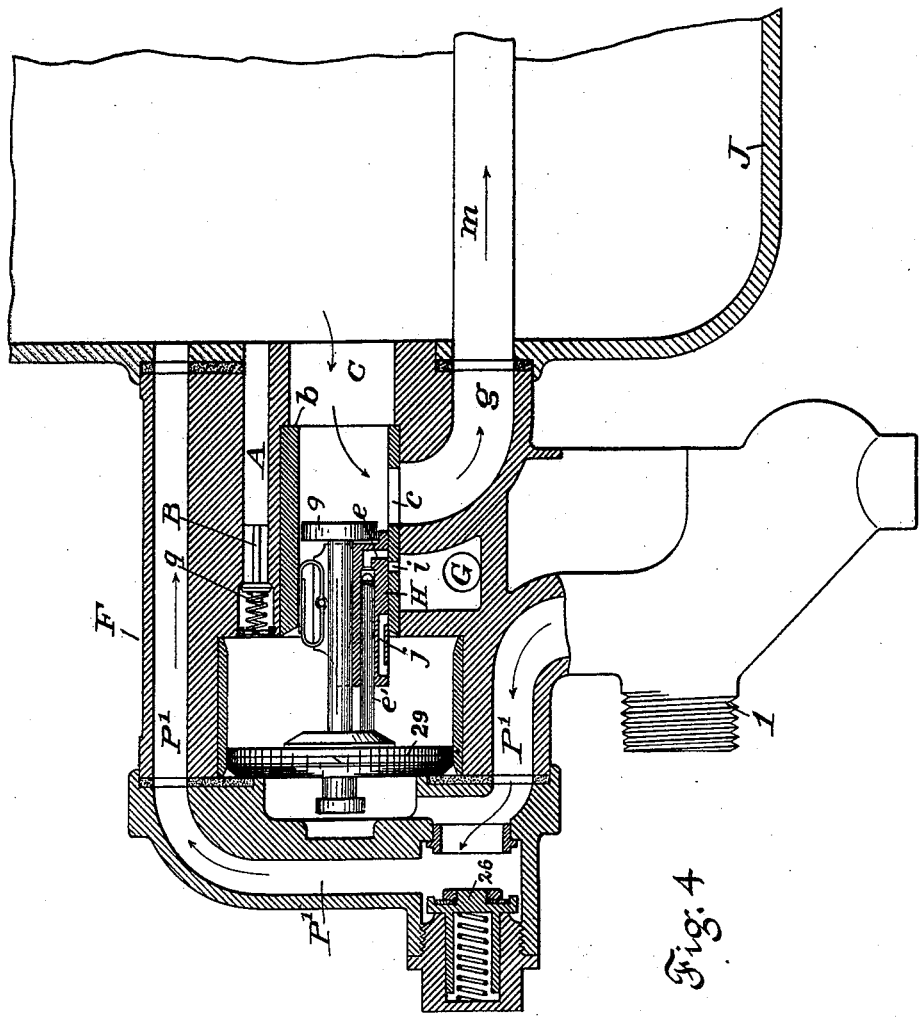

In the accompanying drawings, Figure 1 is a sectional view of the parts which are comprised in an automatic air-brake and shows the passage in the triple-valve case which leads from the train-pipe to discharge train-pipe air exclusively to the auxiliary reservoir. Fig. 2 is a view of part of the auxiliary reservoir, the brake-cylinder connection, and one form of valve mechanism for carrying out my invention. The parts are shown in the release position. Fig. 3 is a view of the same valve mechanism, the parts being shown in the graduating position. Fig. 4 is a view of the same valve mechanism, the parts being shown in the emergency position. The check-valve here shown open would have this position only for the instant that train-pipe air vents to the auxiliary reservoir.

The letter J designates the auxiliary reservoir; I, the brake-cylinder; F, the triple-valve case, and P the train-pipe. The piston L in the brake-cylinder is at the release or running position. The triple-valve case is secured to one end of the auxiliary reservoir, and a pipe $m$ communicates between the triple valve and brake-cylinder. This arrangement of parts is old.

The train-pipe is attached to the screw connection 1 of the triple valve, and a passage $p'$ leads from the train-pipe, so as to discharge train-pipe air exclusively to the auxiliary reservoir. This passage has a feeding-in check-valve 26, which is closed by a spring.

The piston-chamber D has a piston 29, provided with a stem which carries a head 9, that moves in a bushing $b$. A main valve H seats directly in the bushing and is moved by the piston, but is so connected therewith that the piston may have a slight range of movement without moving the said main valve. The main valve H has a graduating-port $e$ and a release-valve cavity $j$. This latter connects between the large port $c$, leading to the brake-cylinder, and the release-port $i$ in the bushing, leading to the opening G to the atmosphere. A graduating-valve $e'$ has the form of a stem or plug and is movable in a bore in the main valve and closes and opens the said graduating-port $e$. This form of main valve H, graduating-valve $e'$, and release-valve $j$ are substantially the same as in United States Patent No. 220,556, dated October 14, 1879. The ordinary operations for service applications of the brakes and for release are like the same parts in said patent.

The end of the graduating-stem has a head $e^2$, which fits loosely in a circular groove $f$, formed in the piston 29. This head is the means for connecting the valve $e'$ to the piston. The valve-chamber C has one end fully open directly to the auxiliary reservoir, and a large port $c$, controlled by the main valve, is in the bushing, and a passage $g$ is between said port and the brake-cylinder or the pipe $m$, leading to the brake-cylinder. Besides the large port $c$ to the brake-cylinder the bushing has an exhaust-port $i$, leading to the atmosphere-opening G.

Provision is made for temporarily confining in the piston-chamber on the auxiliary-reservoir side of the piston the maximum air-pressure of the auxiliary reservoir. This is done by means of a passage A in the valve-case leading from the auxiliary reservoir to the piston-chamber D and a check-valve B in said passage, said check-valve allowing the auxiliary-reservoir air to enter the piston-chamber freely, but temporarily confining it there. A spring $q$ keeps the check-valve normally seated. In operation this check-valve will be seated when the brakes and valve parts are at the release position, as in Fig. 2. The check-valve B will unseat when the valve parts take the graduation position, as in Fig. 3, and said check-valve will first unseat and then instantly seat again when the valve parts are at the emergency position, as in Fig. 4. The effect when making an emergency application is to temporarily confine the maximum or highest auxiliary-reservoir air-pressure on the piston 29 and hold the latter to the extreme limit of its stroke at the left-hand side while making an emergency application of the brakes and until the train-pipe air has flowed through the passage P' to the auxiliary reservoir.

The operation of the improved valve mechanism is as follows: To charge the auxiliary reservoir in readiness for operating the brakes, air-pressure from the train-pipe enters at the connection 1, flows through the entrance end of the passage P' to the piston 29 and moves it to the position seen in Fig. 2, where the release-valve is open. The entering train-pipe air also opens the feeding-in check-valve 26, and said air flows through the remainder of the passage P', leading to the auxiliary reservoir J, and charges said reservoir to the maximum pressure. The brakes are now ready to be operated. It will be seen the passage P' discharges air exclusively into the auxiliary reservoir. The brakes are applied for an ordinary gradual stop, such as stopping a train at a station, by the engineer's valve slowly discharging air from the train-pipe to effect a gradual reduction of pressure. This manner of effecting a reduction of pressure in the train-pipe causes the piston 29 of the valve mechanism to move back to the position shown in Fig. 3, where the release-port $i$ is closed and the graduating-valve port $e$ is opened. The instant this graduating-port opens the movement of piston 29 will be arrested, because auxiliary-reservoir air will flow to the brake-cylinder, and thereby the pressure in the reservoir will be subjected to a somewhat greater reduction than that which the engineer's valve effected in the train-pipe, and the moment the auxiliary-reservoir pressure has been reduced a little below the pressure then in the train-pipe the preponderance of pressure on the piston 29 will of course be on the train-pipe side, and consequently this piston will at once move forward again sufficiently to cause the graduating-valve stem $e'$ to close the small port $e$ and retain the air-pressure just admitted to the brake-cylinder, which will slow up or gradually stop the train.

To apply the brakes quickly for an emergency stop, the engineer's valve must quickly and suddenly reduce the pressure in the train-pipe, which will cause the piston 29 of the valve mechanism to move to the full limit of its stroke, as shown in Fig. 4, where the release-valve is closed and the large valve-port C from the auxiliary reservoir to the brake-cylinder is fully open. The effect is the auxiliary-reservoir air instantly flows through the fully open port C into the brake-cylinder. The pressure of the auxiliary-reservoir air in the passage P' is thus quickly reduced, and simultaneously with the reduction of this pressure the check-valve 26 is opened for an instant by the train-pipe pressure, and train-pipe air instantly flows through the passage P' into the auxiliary reservoir, thereby producing a very rapid maximum-pressure application of each individual brake. This also produces the successive quick action of the several car-brakes throughout the train, this last-named result being caused by the valve mechanism on each car quickly venting train-pipe air into the auxiliary reservoir, as just described. Upon making its full stroke the piston 29 is temporarily held in that position by the high-pressure auxiliary-reservoir air confined by the check-valve B, and consequently the reduction of auxiliary-reservoir pressure, which follows by the air in the reservoir flowing to the brake-cylinder, does not cause a return movement of the piston. The high-pressure auxiliary-reservoir air temporarily confined in the piston-chamber by the check-valve B will eventually be reduced by leakage around the head or partition 9 and equalize with the pressure in the auxiliary reservoir and brake-cylinder.

To release the brakes, the check-valve 26 being closed by its spring the engineer's valve admits to the train-pipe from the main reservoir on the locomotive a sufficient increase of air-pressure to overcome the pressure then existing in the auxiliary reservoir. This increase of pressure in the train-pipe moves the valve-piston 29 toward the right hand to the position shown in Fig. 2, (the auxiliary-reservoir air in the piston-chamber D escaping around the head 9, as already mentioned,) and thereby communication is opened from the brake-cylinder to the atmosphere by way of passage g, the release-cavity j, port i, and opening G. The piston L in the brake-cylinder will thereupon be moved to the release position by the spring y.

From the foregoing it will be seen I have provided a new method of utilizing the vented train-pipe air when making an emergency application of the brakes by discharging said train-pipe air into the auxiliary reservoirs. It will also be seen that this method enables the full maximum pressure to be more quickly charged into the brake-cylinders than has been heretofore possible. This method affords the well-known advantage resulting from reducing the pressure in the train-pipe at numerous points—to wit, producing a very rapid successive application of the brakes on the several cars of a long train and thereby more quickly stops the train and avoids shocks when applying.

It is to be understood that the structural features here shown and the form and location of the ports, valves, and passages may be changed or varied, for the invention as broadly conceived by me and as defined in my claims may be embodied in other forms.

Having thus described my invention, what I claim is—

1. In an air-brake, the combination of a train-pipe; a brake-cylinder; an auxiliary reservoir; and valve mechanism which when making an application of the brakes for an emergency stop will admit auxiliary-reservoir air to the brake-cylinder, and admit train-pipe air to the auxiliary reservoir.

2. In an air-brake, the combination of a train-pipe; a brake-cylinder; an auxiliary reservoir; a triple valve; a passage leading from the train-pipe to discharge train-pipe air exclusively to the auxiliary reservoir; and means to hold the triple-valve parts in the fully-applied position while air from the train-pipe flows to the auxiliary reservoir for making an emergency application of the brakes.

3. In an air-brake, the combination of a train-pipe; a brake-cylinder; an auxiliary reservoir; a triple valve; a passage leading from the train-pipe to discharge train-pipe air exclusively to the auxiliary reservoir; and means to temporarily confine auxiliary-reservoir air in the triple-valve piston-chamber when making an emergency application of the brakes.

4. The combination of a train-pipe; an auxiliary reservoir; a brake-cylinder, and a triple valve having a graduating-valve for making service applications of the brakes with any desired pressure less than the maximum, and also having a main valve to apply the brakes quickly with maximum pressure for an emergency stop by admitting only auxiliary-reservoir air to the brake-cylinder, said triple valve provided with a passage for admitting train-pipe air exclusively to the auxiliary reservoir while the auxiliary air is flowing to the brake-cylinder through the open main valve.

5. In an air-brake for cars, the combination of a train-pipe; a brake-cylinder; an auxiliary reservoir; a triple valve; and a passage independent of the triple-valve chamber and communicating from the train-pipe to the auxiliary reservoir, whereby air vented from the train-pipe under each car when making an emergency application of the brakes, will be discharged exclusively into the auxiliary reservoir.

In testimony whereof I affix my signature in the presence of two witnesses.

GEORGE A. BOYDEN.

Witnesses:
CHARLES B. MANN, Jr.,
CHAPIN A. FERGUSON.